(12) United States Patent
Hanna et al.

(10) Patent No.: US 9,490,612 B2
(45) Date of Patent: Nov. 8, 2016

(54) SWITCHGEAR MANUAL CONTROL PLUG RACKING INTERLOCK STRUCTURE

(71) Applicant: ABB TECHNOLOGY AG, Zurich (CH)

(72) Inventors: Robert L. Hanna, Winter Park, FL (US); Alessandro Bonfanti, Lake Mary, FL (US); Amar G. Kini, Lake Mary, FL (US)

(73) Assignee: ABB Schweiz AG, Zurich (CH)

( * ) Notice: Subject to any disclaimer, the term of this patent is extended or adjusted under 35 U.S.C. 154(b) by 0 days.

(21) Appl. No.: 14/683,588

(22) Filed: Apr. 10, 2015

(65) Prior Publication Data
US 2016/0301196 A1    Oct. 13, 2016

(51) Int. Cl.
| | |
|---|---|
| *H02B 11/02* | (2006.01) |
| *H02B 11/133* | (2006.01) |
| *H02B 11/167* | (2006.01) |
| *H02B 11/127* | (2006.01) |
| *H01H 9/20* | (2006.01) |
| *H01H 33/14* | (2006.01) |
| *H01H 3/46* | (2006.01) |

(52) U.S. Cl.
CPC .............. *H02B 11/133* (2013.01); *H01H 3/46* (2013.01); *H01H 9/20* (2013.01); *H01H 33/14* (2013.01); *H02B 11/127* (2013.01); *H02B 11/167* (2013.01)

(58) Field of Classification Search
CPC ...... H01H 33/14; H01H 3/46; H02B 11/127; H02B 11/133

USPC ......... 200/50.24, 50.25, 50.21; 361/605–610
See application file for complete search history.

(56) References Cited

U.S. PATENT DOCUMENTS

| | | | | |
|---|---|---|---|---|
| 4,004,113 A * | 1/1977 | Ericson | ............... | H02B 11/133 200/50.25 |
| 6,777,627 B1 * | 8/2004 | Stevenson | ............... | H02B 3/00 200/50.21 |
| 6,951,990 B1 * | 10/2005 | Miller | ............... | H02B 11/127 200/50.21 |
| 2011/0147173 A1 * | 6/2011 | Lee | ............... | H02B 11/127 200/50.25 |
| 2012/0118711 A1 * | 5/2012 | Han | ............... | H02B 11/133 200/50.25 |
| 2012/0199450 A1 * | 8/2012 | Bower | ............... | H02B 11/127 200/50.25 |

* cited by examiner

*Primary Examiner* — Renee Luebke
*Assistant Examiner* — Ahmed Saeed
(74) *Attorney, Agent, or Firm* — Manelli Selter PLLC; Edward J. Stemberger

(57) ABSTRACT

Interlock structure for a circuit breaker is constructed and arranged such that 1) when a control plug is disconnected from a socket, a portion of a linkage structure engages a racking linkage, causing a portion of the racking linkage to engage a racking screw, preventing the racking screw from rotating and thus preventing racking of the circuit breaker, and 2) when the control plug is connected with the socket, the linkage structure is actuated thereby moving the portion of the linkage structure to disengage from the racking linkage such that the portion of the racking linkage disengages from the racking screw, permitting the racking screw to rotate thereby permitting the circuit breaker to be racked to a connected position, where the primary contacts are connected to the main bus.

11 Claims, 5 Drawing Sheets

SWITCHGEAR MANUAL CONTROL PLUG RACKING INTERLOCK STRUCTURE

FIELD

The invention relates to withdrawable medium voltage circuit breakers with manual control plug for auxiliary control voltage and, more particularly, to interlock structure associated with the manual control plug in order to prevent insertion of the circuit breaker to the connect position, where the primary contacts are connected to the main bus of the switchgear, until the manual control plug is connected.

BACKGROUND

A commonly employed method to interlock with a manual control plug is by using a magnetic solenoid which blocks the racking of the circuit breaker when the manual control plug is disconnected. With this method, auxiliary control voltage, which is used to power the auxiliary features of the circuit breaker, energizes the magnetic solenoid and releases the interlock and allows the circuit breaker to be racked into the connect position. With the magnetic solenoid method of interlocking, the presence of auxiliary control voltage is required in order to rack the circuit breaker into or out of connected position. In situations where the auxiliary power is not available, the circuit breaker is not able to be installed or removed from the connected position. The requirement to install the manual control plug and the use of a magnetic solenoid adds an additional requirement of the presence of auxiliary voltage in order to install or remove the circuit breaker and is not acceptable by many customers due to the rare cases where installation or removal needs to be done without auxiliary voltage.

Another conventional solution for this problem involves using an automatic connecting auxiliary control connector where the connection for the auxiliary control voltage is made as part of the racking operation. This method requires the use of a specially designed plug and socket which is prone to misalignment. There also exists a configuration to install the manual control plug at the base of the racking truck in order to allow racking, but the configuration requires an alignment of the plug and socket and is prone to misalignment.

Thus, there is a need to provide a racking interlock structure that prevents racking of a circuit breaker into or out of the connect position without the control plug connected and without requiring auxiliary voltage or special alignment features of a plug and socket.

SUMMARY

An object of the invention is to fulfill the need referred to above. In accordance with the principles of the present invention, this objective is obtained by providing an interlock structure for a circuit breaker. The circuit breaker has primary contacts connectable with a main bus, and a control plug for providing an auxiliary control voltage. The interlock structure includes a racking truck constructed and arranged to receive the circuit breaker and to move the circuit breaker with respect to at least one rail. The racking truck includes a rotatable racking screw for racking the circuit breaker, and a racking linkage associated with the racking screw and normally biased so as to be disengaged from the racking screw. A socket is constructed and arranged to receive the control plug. Linkage structure is provided between the socket and the racking linkage. The interlock structure is constructed and arranged such that 1) when the control plug is disconnected from the socket, a portion of the linkage structure engages the racking linkage, causing a portion of the racking linkage, against the bias thereon, to engage the racking screw, preventing the racking screw from rotating and thus preventing racking of the circuit breaker, and 2) when the control plug is connected with the socket, the linkage structure is actuated thereby moving the portion of the linkage structure to disengage from the racking linkage such that the portion of the racking linkage disengages from the racking screw, permitting the racking screw to rotate thereby permitting the circuit breaker to be racked to a connected position, where the primary contacts are connected to the main bus.

In accordance with another aspect of the disclosed embodiment, a method is provided for preventing racking of a circuit breaker to a connected position until a control plug of the circuit breaker is connected to a socket. The method provides the socket separate from the circuit breaker. The circuit breaker is provided on a racking truck that has a racking screw for racking the circuit breaker. When the control plug is disconnected from the socket, the racking screw is solely mechanically prevented from rotating and the circuit breaker is prevented from being racked. When the control plug is connected with the socket, the racking screw is permitted to rotate to permit the circuit breaker to be racked to the connected position.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXEMPLARY EMBODIMENT

Figure 1:
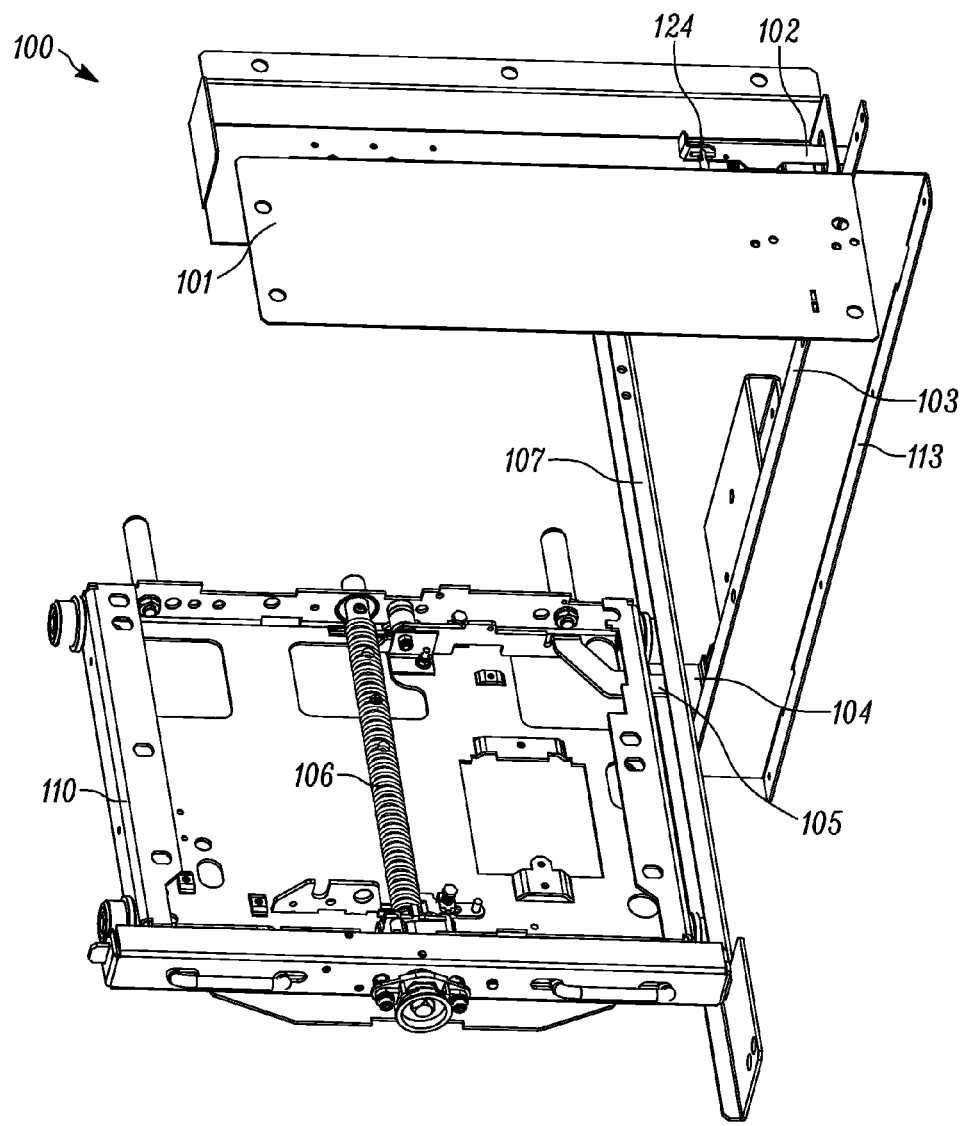
FIG. 1 is a perspective view of interlock structure for a circuit breaker in accordance with an embodiment.
Figure 5:
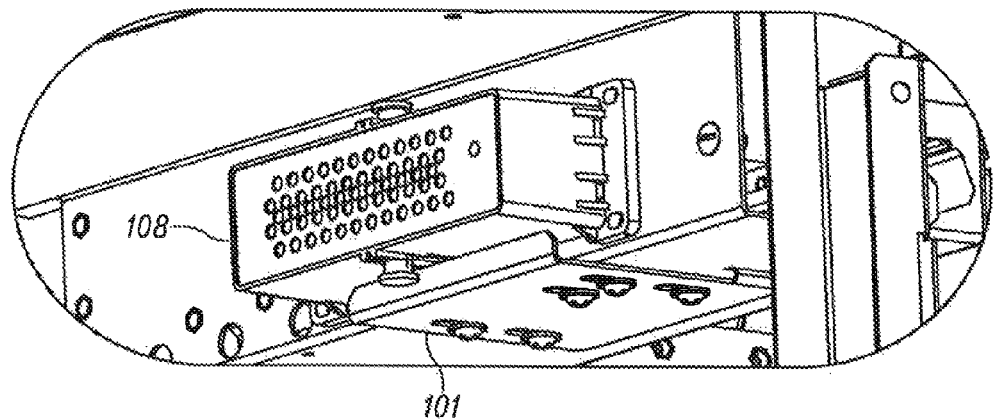
FIG. 5 is an enlarged view of a slide and a socket of the interlock structure of FIG. 1.

With reference to FIG. 1, perspective view of interlock structure is shown, generally indicated at 100, in accordance with an embodiment. The interlock structure 100 includes a circuit breaker racking truck 110 constructed and arranged to receive and move a circuit breaker 112 (FIG. 7) along a pair of rails (one rail 107 is shown in FIG. 1). As best shown FIGS. 1 and 5, the interlock structure 100 includes a slide 101 coupled with a connector socket 108 (not shown in FIG. 1). The connector socket 108 is constructed and arranged to connect with a manual control plug 109 of the medium voltage circuit breaker 112, which will be explained more fully below. The racking truck 110 includes the conventional racking screw 106 for racking the circuit breaker 112.

Figure 2:
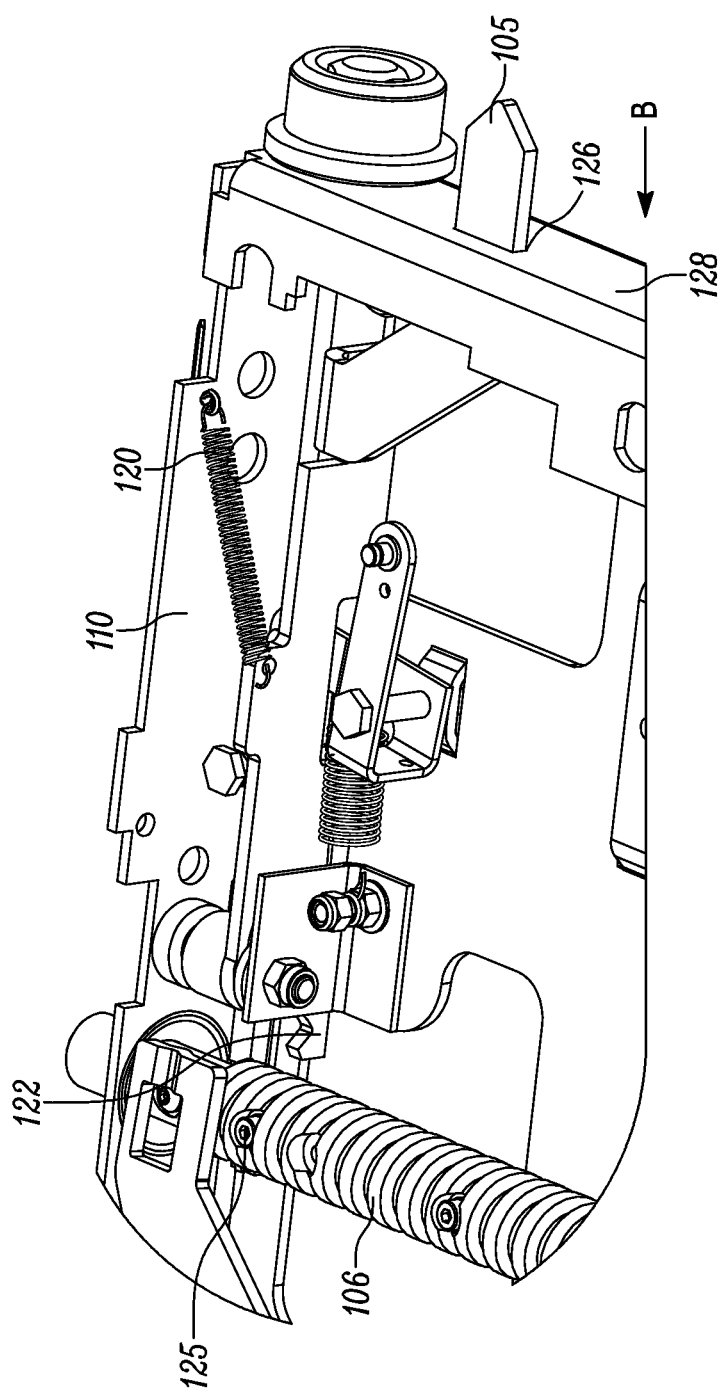
FIG. 2 is an enlarged view of a portion of the racking truck of the interlock structure of FIG. 1 showing the racking screw, and showing a racking linkage.
Figure 3:
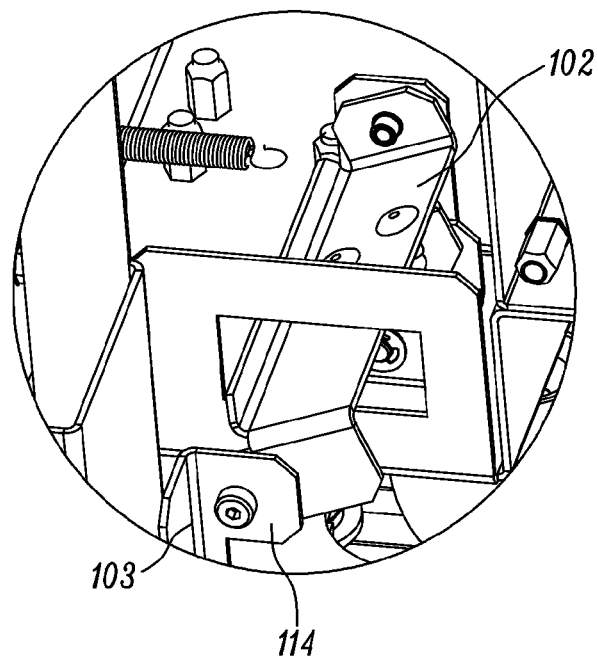
FIG. 3 is an enlarged view of a rotating lever and an end of a vertical linkage of the interlock structure of FIG. 1.
Figure 4:
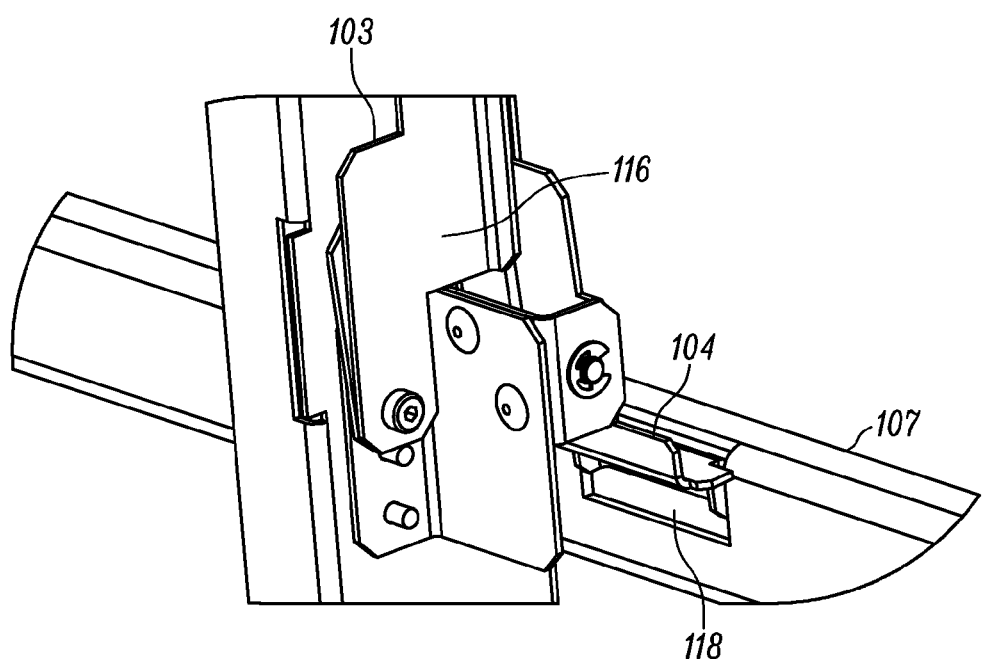
FIG. 4 is an enlarged view of another end of the vertical linkage connected to a paddle of the interlock structure of FIG. 1.

As best shown in FIGS. 1 and 3, the slide 101 is connected to a rotating lever 102 such that linear movement of the slide 101 causes rotation of the lever 102. The lever 102 is also connected to a first end 114 of a first linkage 103 such that rotational movement of the lever 102 causes downward linear movement of the first linkage 103. As shown in FIGS. 1 and 4, a second end 116 of the first linkage 103 is connected with a paddle or second linkage 104 such that the linear movement of the first linkage 103 causes rotation of the second linkage 104 away from the circuit breaker rail 107. The second linkage 104 is associated with a third, or racking linkage 105 disposed in the racking truck 110, the function of which will become apparent below. The linkage 105 is normally biased by a spring 120 in the free racking position (outward away from the racking screw 106) so as to extend through a slot 126 in a side 128 of the racking truck 110, as shown in FIG. 2. The slide 101, lever 102, first linkage 103, and the second linkage 104 can be considered linkage structure disposed between the socket 108 and the racking linkage 105. The slide 101 and first linkage 103 can be supported by a post 113 that is coupled to the rail 107.

Figure 6:
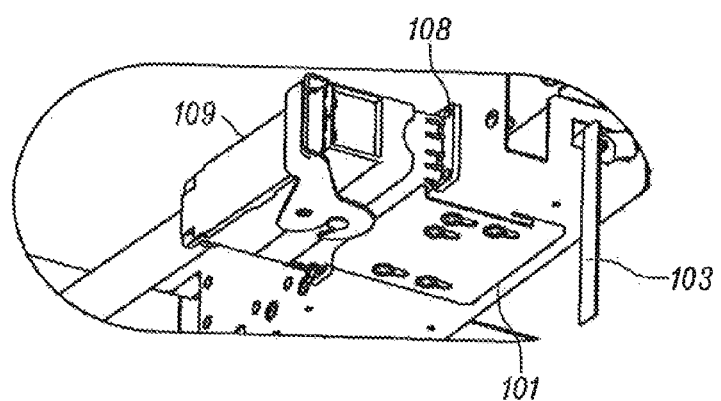
FIG. 6 is an enlarged view of a manual control plug connected with the slide of the interlock structure of FIG. 1.
Figure 7:
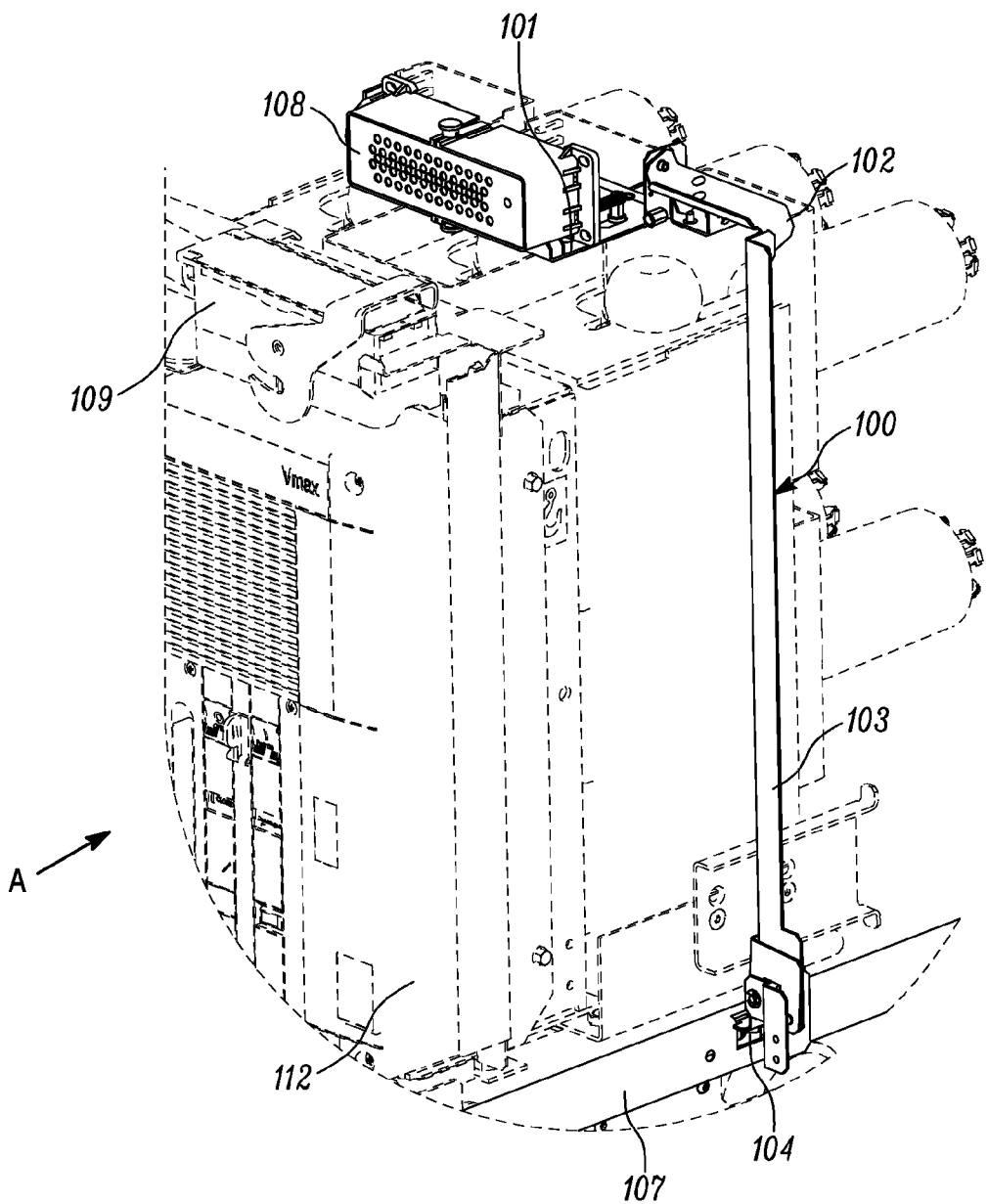
FIG. 7 is a perspective view of the interlock structure of FIG. 1, with a manual control plug of a circuit breaker connected with the socket.

With reference to FIGS. 2, 6 and 7, operation of the interlock structure 100 will be appreciated. When the plug 109 is disconnected from the socket 108, a spring 124 (FIG. 1) biases the lever 102 such that the first linkage 103 causes the second linkage 104 to engage or push the racking linkage 105, causing the racking linkage 105 to actuate inwardly (direction B in FIG. 2) towards the racking screw 106 and against the bias of spring 120. With the linkage 104 pushing the linkage 105 inwardly, an end of a bolt 125 in the racking screw 106 (the end is on the other side of the screw 106 and not seen in FIG. 2) rotates around and is caught by a tip 122 of linkage 105 which prevents further racking.

The control plug 109 is aligned by the operator and connected with the socket 108 of the interlock structure 100. This movement causes linear movement of the slide 101 in the direction of arrow A which causes rotation of the rotating lever 102 causing linear movement of the first linkage 103, which causes the second linkage 104 to rotate away from the circuit breaker rail 107 to disengage with the racking linkage 105. This movement of the linkage 104 allows the linkage 105 to slide outward and away from the racking screw 106 (in a direction opposite of direction of arrow B in FIG. 2). With the tip 122 of linkage 105 in the position shown in FIG. 2, the bolt 125 and the racking screw 106 can rotate freely and the circuit breaker 112 can be racked to the connected position, where the conventional primary contacts of the circuit breaker 112 are connected to the main bus.

Thus, the interlock structure 100 solely mechanically prevents racking into or out of the connected position of the circuit breaker 112 without the control plug 109 connected with the socket 108 by blocking the rotation of the racking screw 106. The interlock structure 100 advantageously enables the use of a manual control plug 109 without the risk of misalignment of the plug 109 and socket 108 and without requiring the presence of an auxiliary control voltage to casing the interlock. The linkage structure (linkages 101, 102, 103, 104) along with linkage 105 can be cables or other mechanical means for actuating the interlock mechanism.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An interlock structure for a circuit breaker, the circuit breaker having primary contacts connectable with a main bus, and a control plug for providing an auxiliary control voltage, the interlock structure comprising:
   a racking truck constructed and arranged to receive the circuit breaker and to move the circuit breaker with respect to a rail, the racking truck comprising a rotatable racking screw for racking the circuit breaker, and a racking linkage associated with the racking screw, and normally biased so as to be disengaged from the racking screw,
   a socket constructed and arranged to receive the control plug,
   linkage structure between the socket and the racking linkage,
   the interlock structure being constructed and arranged such that 1) when the control plug is disconnected from the socket, a portion of the linkage structure engages the racking linkage, causing a portion of the racking linkage, against the bias thereon, to engage the racking screw, preventing the racking screw from rotating and thus preventing racking of the circuit breaker, and 2) when the control plug is connected with the socket, the linkage structure is actuated thereby moving the portion of the linkage structure to disengage from the racking linkage such that the portion of the racking linkage disengages from the racking screw, permitting the racking screw to rotate thereby permitting the circuit breaker to be racked to a connected position, where the primary contacts are connected to the main bus.

2. The interlock structure of claim 1, wherein the linkage structure comprises:
   a slide coupled to the socket,
   a rotating lever coupled to the slide such that linear movement of the slide causes rotation of the lever,
   a first linkage coupled to the lever such that rotational movement of the lever causes linear movement of the first linkage, and
   a second linkage adjacent to the at least one rail and coupled to the first linkage such that the linear movement of the first linkage causes rotation of the second linkage away from the circuit breaker rail, the second linkage being associated with the racking linkage, such that 1) when the control plug is disconnected from the socket, a portion of the second linkage engages the racking linkage, causing the portion of the racking linkage, against the bias thereon, to engage the racking screw, preventing the racking screw from rotating, and 2) when the control plug is connected with the socket causing movement of the slide, the lever rotates causing linear movement of the first linkage, which causes the second linkage to rotate and disengage with the racking linkage such that the portion of the racking linkage disengages from the racking screw.

3. The interlock structure of claim 1, further comprising a spring biasing the racking linkage to a positon to be disengaged from the racking screw.

4. The interlock structure of claim 2, further comprising a second spring biasing the portion of the linkage structure to engage the racking linkage when the control plug is disconnected from the socket.

5. The interlock structure of claim 1, wherein the racking linkage is constructed and arranged to extend through a slot in a side of the racking truck when disengaged from the racking screw.

6. The interlock structure of claim 1, wherein the racking screw includes a bolt that engages the racking linkage when the control plug is disconnected from the socket.

7. The interlock structure of claim 1, in combination with the circuit breaker.

8. A method of preventing racking of a circuit breaker to a connected position until a control plug of the circuit breaker is connected to a socket, the method comprising:
provide the socket separate from the circuit breaker,
providing the circuit breaker on a racking truck that has a racking screw for racking the circuit breaker,
when the control plug is disconnected from the socket, solely mechanically preventing the racking screw from rotating and thus preventing racking of the circuit breaker, and
when the control plug is connected with the socket, permitting the racking screw to rotate to permit the circuit breaker to be racked to a the connected position.

9. The method of claim 8, wherein the step of solely mechanically preventing the racking screw from rotating comprises:
providing a racking linkage in the racking truck, the racking linkage being associated with the racking screw, and
providing linkage structure between the racking linkage and the socket such that when the control plug is disconnected from the socket, a portion of the linkage structure engages the racking linkage causing a portion of the racking linkage to engage the racking screw, preventing the racking screw from rotating.

10. The method of claim 8, wherein the step of permitting the racking screw to rotate comprises:
providing a racking linkage in the racking truck, the racking linkage being associated with the racking screw, and
providing linkage structure between the racking linkage and the socket such that when the circuit breaker is moved to connect the control plug with the socket, the linkage structure is actuated thereby moving a portion of the linkage structure to disengage from the racking linkage such that a portion of the racking linkage disengages from the racking screw, permitting the racking screw to rotate.

11. The method of claim 10, wherein the step of providing the linkage structure provides the linkage structure as comprising:
a slide coupled to the socket,
a rotating lever coupled to the slide such that linear movement of the slide causes rotation of the lever,
a first linkage coupled to the lever such that rotational movement of the lever causes linear movement of the first linkage, and
a second linkage adjacent to the at least one rail and coupled to the first linkage such that the linear movement of the first linkage causes rotation of the second linkage away from the circuit breaker rail, the second linkage being associated with the racking linkage, such that 1) when the control plug is disconnected from the socket, a portion of the second linkage engages the racking linkage, causing the portion of the racking linkage, against the bias thereon, to engage the racking screw, preventing the racking screw from rotating, and 2) when the control plug is connected with the socket causing movement of the slide, the lever rotates causing linear movement of the first linkage, which causes the second linkage to rotate and disengage with the racking linkage.

* * * * *